No. 844,528. PATENTED FEB. 19, 1907.
A. M. MENDELSON.
ADJUSTABLE PAN AND VESSEL LIFTER.
APPLICATION FILED MAY 7, 1906.
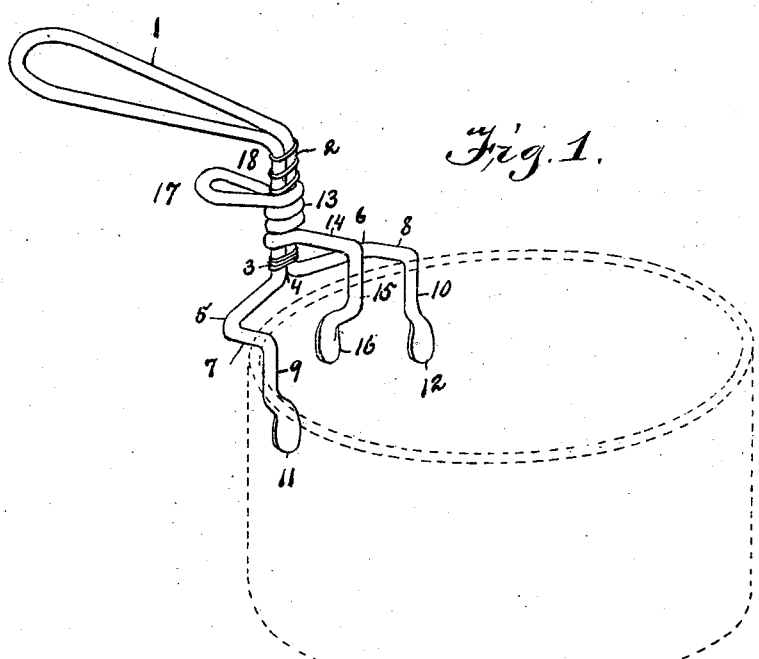
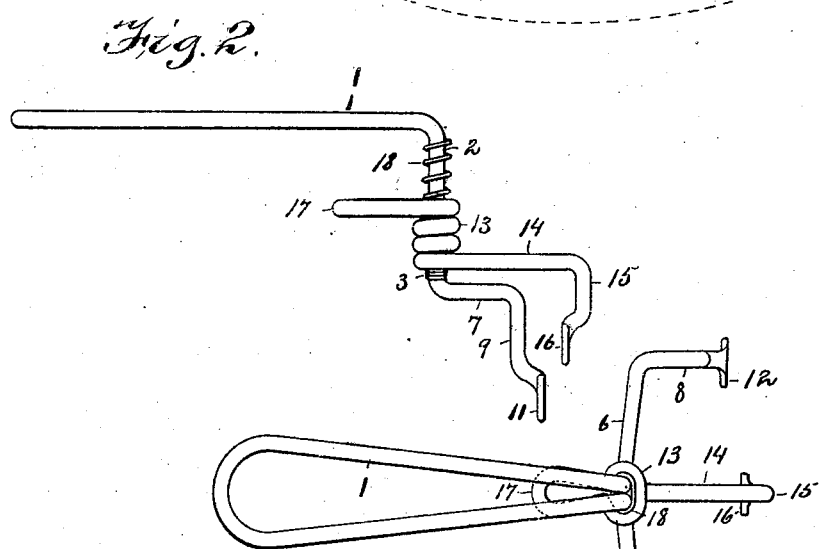
WITNESSES
INVENTOR
Abraham M. Mendelson.
BY
Harold C. Mendelson
ATTORNEY

UNITED STATES PATENT OFFICE.

ABRAHAM M. MENDELSON, OF NEW YORK, N. Y.

ADJUSTABLE PAN AND VESSEL LIFTER.

No. 844,528.     Specification of Letters Patent.     Patented Feb. 19, 1907.

Application filed May 7, 1906. Serial No. 315,697.

*To all whom it may concern:*

Be it known that I, ABRAHAM M. MENDELSON, a citizen of the United States, residing in the borough of Manhattan, city of New York, county of New York, State of New York, have invented a new and useful Adjustable Pan and Vessel Lifter, of which the following is a specification.

This invention relates to pan or vessel lifters which are used for lifting and removing pans or vessels of various sizes and forms from the stove or oven.

One of the objects of this invention is to provide simple and effective means whereby pans and other vessels can be removed from the stove or oven while in a heated condition with greater celerity and safety than by the present method, where the handles are stationary or fixed to the pans or vessels.

Another object of this invention is to provide a pan or vessel lifter which has an adjustable support that can be easily and readily adjusted to the various sizes and forms of pans or vessels used for cooking purposes.

In the various figures of the accompanying drawings similar reference characters are employed to denote similar parts.

In the drawings forming part of this specification, Figure 1 is a perspective view showing the application of the device to a circular pan or vessel. Fig. 2 is a side elevation showing the support depressed by the spring. Fig. 3 is a plan.

The pan or vessel lifter constructed according to this invention comprises a handle 1, having a depending portion 2, which is rigidly secured together by means of the wire 3 at the point 4, where the depending portion 2 diverges to the right and left, forming the legs 5 and 6. The legs 5 and 6 extend outwardly, forming the sides 7 and 8, which have depending portions 9 and 10. The lower ends of the depending portions 9 and 10 are flattened, forming feet 11 and 12, in order to prevent indents being made in the pan or vessel while being removed from the stove or oven. The support 13 is slidably mounted on the depending portion 2 and is adapted to be adjusted up and down on the depending portion 2. A member 14, forming part of the support 13, extends outwardly intermediate between the sides 7 and 8 of the legs 5 and 6. A depending portion 15, formed on the member 14, is flattened on the end thereof, forming the foot 16, which is adapted to support the pan or vessel rigidly in the lifting operation. The depending portion 15 is bent slightly rearward close to the foot 16 in order to facilitate the operation of clasping the support against the inside of pan or vessel preparatory to removing the pan or vessel from the stove or oven. A handle 17, formed on the rear side of the support 13, is adapted for manually operating the support 13 while placing or replacing the lifter on or off the pan or vessel. The spring 18 is mounted on the depending portion 2 and is in operative contact with the handle 1 and the top of the support 13 and is adapted to keep the support 13 depressed close to the legs 5 and 6.

The operation of the device is as follows: The support 13 is pressed upward by means of the handle 17 until the foot 16, formed on the depending portion 15, is clear above the sides 7 and 8 of the legs 5 and 6. The depending portion 15 of the member 14 is then placed on the inside of the pan or vessel and the foot 16 pressed against the inside of the pan or vessel. The feet 11 and 12 are pressed against the outside of the pan or vessel, and the support 13 being released the spring 18 forces the support 13 downward, thereby giving the feet 11, 12, and 16 a firm hold on the pan or vessel during the lifting operation. When the device is placed on the sides or walls of a pan or vessel preparatory to lifting same, as shown in Fig. 1 of the drawings, the handle 1 is held firmly in the hand and the outer end of the handle 1 is pressed downward in the lifting operation. The strain on the feet 11, 12, and 16 by the weight of the vessel causes the feet 11, 12, and 16 to firmly grip the outer and inner walls of the vessel, thereby preventing the lifter from slipping up off of the vessel.

Having described my invention, I claim—

1. In a vessel-lifter, a handle having a depending portion at one end thereof, a plurality of arms fixed to and diverging from the depending portion and adapted to engage one side of the side wall of a vessel, an arm slidably mounted on said depending portion of the handle, said arm when in one of its positions being adapted to engage the other side of the said side wall of the vessel in opposition to and coacting with said fixed arms to support the vessel when lifted.

2. In a vessel-lifter, a handle having a depending portion at one end thereof, a plurality of arms fixed to and diverging from the depending portion and adapted to engage one side of the side wall of a vessel, an arm slidably mounted on said depending portion of the handle, said arm when in one of its positions being adapted to engage the other side of the said side wall of the vessel in opposition to and coacting with said fixed arms to support the vessel when lifted, and a spring mounted on the depending portion of said handle and acting upon said arm to maintain the same yieldably under tension.

3. In a vessel-lifter, a handle having a depending portion at one end thereof, a plurality of arms fixed to and diverging from the depending portion, feet fixed to said arms and adapted to engage one side of the side wall of a vessel, an arm slidably mounted on said depending portion of the handle, spring means for retaining said arm yieldably under tension, said arm being provided with a foot at one end thereof adapted when said arm is in one of its positions to engage the other side of the said side wall of the vessel in opposition to and coacting with said feet on said fixed arms to support the vessel when lifted.

4. In a vessel-lifter, a handle having a depending portion at one end thereof, a plurality of arms fixed to and diverging from the depending portion, feet fixed to said arms and adapted to engage one side of the side wall of a vessel, an arm slidably mounted on said depending portion of the handle, a handle fixed to one end of said arm adapted for manually operating said arm in its upward movement, a depending portion at the other end of said arm being provided with a foot adapted when said arm is in one of its positions to engage the other side of the said side wall of the vessel in opposition to and coacting with said feet on said fixed arms to support the vessel when lifted.

ABRAHAM M. MENDELSON.

Witnesses:
   THOMAS C. PATTERSON,
   HELEN ZURICH.